June 4, 1963   K. O. ANDERSEN   3,092,052
HARROW TOOTH FOR THE DISPENSING OF LIQUID AMMONIA INTO THE SOIL
Filed June 22, 1960
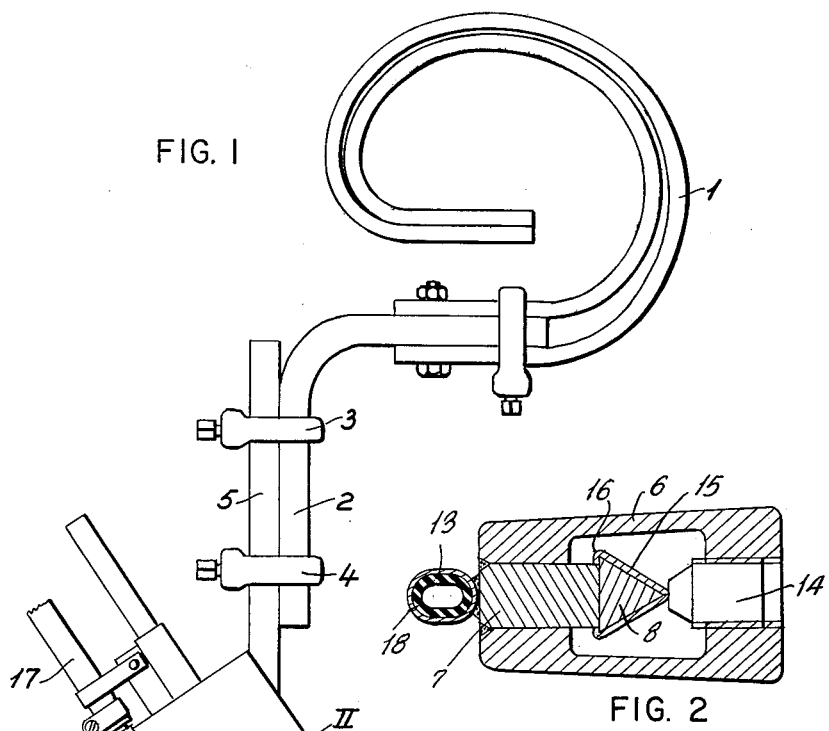
FIG. 1
FIG. 2
FIG. 3
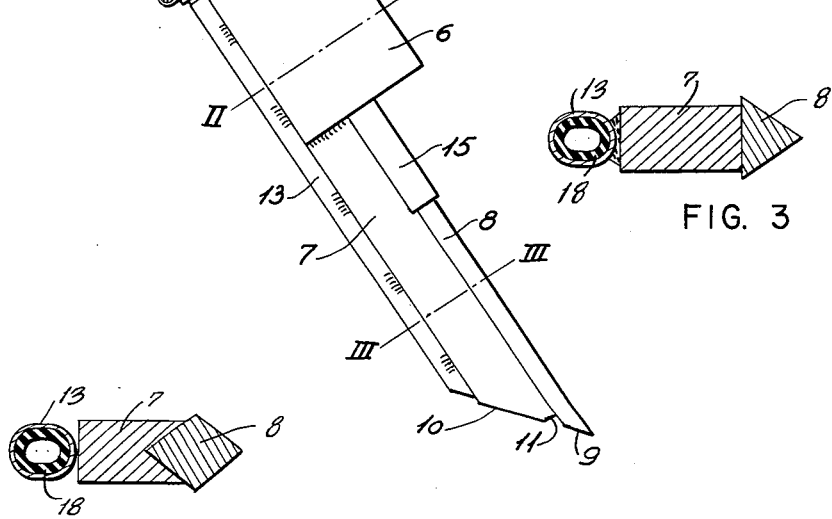
FIG. 4
INVENTOR
Kaj Otto Andersen
BY
Watson, Cole, Grindle & Watson
ATTORNEYS young# United States Patent Office 3,092,052
Patented June 4, 1963

3,092,052
HARROW TOOTH FOR THE DISPENSING OF
LIQUID AMMONIA INTO THE SOIL
Kaj Otto Andersen, Nyvang, near Skelskor, Denmark
Filed June 22, 1960, Ser. No. 38,011
Claims priority, application Denmark June 26, 1959
4 Claims. (Cl. 111—7)

This invention relates to a harrow tooth for the dispensing of liquid ammonia into the soil, said harrow tooth having a tooth body of forwardly tapering cross section and having a tube for conducting the ammonia mounted on the rear side thereof.

The spreading of liquid ammonia is a fertilizing method which has become much favored during the later years, one reason for this being that by this method it is possible to obtain a very uniform spreading of the fertilizer, because the latter when poured passes into the gaseous phase and spreads from the furrow, into which it has been poured, to the surrounding earth formations. However, in order to obtain good results, it is essential that the furrow formed by the harrow tooth and into which the pouring takes place should be covered with earth immediately after the pouring has taken place, seeing that otherwise the ammonia will escape to the atmosphere gradually as it evaporates.

With the harrow teeth of the above mentioned type so far known the rapid and efficient closing of the furrow is rendered difficult by the circumstance that the harrow tooth is inclined to compress and smooth the earth in the sides of the furrow so that the earth to some extent loses its inclination to crumble and fall down, particularly where relatively moist or stiff soil is concerned.

Moreover, the side faces of the harrow tooth, when sliding along the sides of the furrow and compressing the earth, are subjected to heavy wear so that a frequent replacement is required.

It is the object of the invention to remedy these drawbacks, and with this object in view, according to the invention, the front portion of said tooth body is formed by a separate bar, which is longitudinally adjustable relative to the tooth body and has a wedge shaped cross section, the rear edges of which project beyond the side faces of the tooth body, said bar being tapered at its lower end.

Owing to this arrangement of the harrow tooth, the earth, immediately after having been pushed aside by the bar mounted at the front edge of the tooth body, loses contact with the side faces of the harrow tooth and is not subjected to any smoothing action so that the earth can immediately begin to fall down and is already in the process of so doing when encountered by the ammonia tube. Consequently, the furrow is very rapidly and efficiently closed above the injected ammonia. Moreover, the wear is limited to the front bar, which is easy and inexpensive to replace, and which may besides be slid downwards relative to the tooth body gradually as it is worn, the wear taking place principally at the lower end.

Owing to the tapering configuration of the lower end of the front bar, the harrow tooth can conveniently be introduced into the soil in spite of the fact that it must be relatively big in order to obtain sufficient strength and support for the ammonia tube. In fact, if the front bar is so adjusted that its tip extends beyond the end of the tooth body, the said tip will easily penetrate into the soil, thereby preparing for the introduction of the tooth body and the ammonia tube mounted thereon.

According to the invention, the tooth body may advantageously be constructed with a rectangular cross section, while the front bar has a cross sectional shape substantially in the form of an isosceles triangle having its base facing backwards. By this construction, the described earth loosening and wear reducing effect will be particularly pronounced, and the change of the shape of the tooth caused by wear on the front bar will be as small as possible. A correspondingly favorable construction may, according to the invention, be obtained by constructing the tooth body in its front face with a groove of triangular cross section, the front bar having a quadrangular cross section fitting in said groove with one of its corners located at the bottom of the groove.

According to the invention, the tapering tip of the front bar may preferably be obtained by constructing same with a rearwardly disposed inclined surface, while constructing the tooth body with a similar rearwardly disposed inclined surface, which however does not extend fully to the front side of the tooth body, but connects with the latter through a blunt end surface. By the described configuration of the front bar and the tooth body the introduction of the harrow tooth into the soil is facilitated because the inclined surface of the tooth body easily finds its way into the hole in the soil formed by the front bar.

In an advantageous embodiment of the invention, a clamping block is connected with the tooth body, which clamping block surrounds the front bar and carries a clamping screw serving to press the front bar firmly against the tooth body. The front bar may then be longitudinally displaced relative to the tooth body by just loosening the said clamping screw and again tightening it when the front bar has been slid forward to its new position.

An accurate guiding of the front bar relative to the tooth body can be obtained according to the invention by providing a guiding sheath extending along part of the length of the front bar and fitting around the two oblique front faces thereof and constructed with bent edges for abutment against the side faces of the tooth body. In this manner, the front bar is securely held in an accurate position along the front surface of the tooth body, despite the fact that only a single clamping screw is employed for holding these two parts together.

The invention will now be described in further detail with reference to the accompanying drawings, in which FIG. 1 shows one form of a harrow tooth according to the invention, in side view, FIG. 2 a cross section along the line II—II in FIG. 1, FIG. 3 a cross section along the line III—III in FIG. 1, and FIG. 4 a corresponding section through a slightly modified embodiment.

The harrow tooth illustrated in the drawing is constructed in known manner with a resilient suspending portion 1 carrying a downwardly extending shaft portion 2. A second shaft portion 5 is connected to the shaft portion 2 by means of two clamping straps 3 and 4. At its lower end, the shaft portion 5 is connected with a clamping block 6, to which a tooth body 7 is welded at the bottom of the block in such a manner as to extend somewhat into a longitudinal passage provided in the block. Along the front surface of the tooth body 7 a bar 8 is provided, which is also surrounded by the branches of the block 6 and is held in contact with the tooth body 7 by means of a clamping screw 14 provided in the head of the block. The front bar 8 is guided relative to the tooth body 7 by means of a guiding sheath 15 enclosing the two oblique front faces of the front bar and having bent edges 16 abutting the side surfaces of the tooth body 7.

As is apparent from FIGURES 2 and 3, the tooth body 7 has a substantially rectangular cross section, while the front bar 8 has a cross section in the form of an isosceles triangle having its base facing backwards. Alternatively, as illustrated in FIGURE 4, the front bar 8 may be constructed with a quadrangular cross sectional shape fitting in a groove of triangular cross section in the front surface of the tooth body. At its lower end, the front bar is tapered by means of a rearwardly disposed inclined surface 9, while the tooth body 7 is constructed at its lower end with a similar rearwardly disposed inclined surface 10, which, however, does not extend fully to the front face of the tooth body, but connects with the latter through a blunt end surface 11.

A tube 13 serving to conduct liquid ammonia down into the furrow formed by the harrow tooth is welded to the rear face of the tooth body 7. The ammonia is supplied to the tube 13 through a hose 17. The tube 13 is coated on its inner wall with an insulating lining 18, e.g. in the form of a flexible tube of polyethylene or another artificial resin, thereby limiting the tendency to ice formation on the tooth body as a consequence of the cooling caused by the evaporation of the ammonia during its flow through the ammonia tube. This is important, because any ice formation on the tooth body might result in the formation of a lump protruding far enough from the tooth body to be capable of smoothing the side walls of the furrow, thereby destroying the effect obtained by the employment of the front bar.

When loosening the clamping screw 14 it becomes possible to displace the front bar 8 relative to the tooth body 7, and when the front bar has been slid forward to the desired position it can again be secured relative to the tooth body by tightening the clamping screw 14.

I claim:

1. A harrow tooth for the dispensing of liquid ammonia into the soil comprising a depending longitudinally disposed tooth body having a front portion, a rear face and laterally opposed side faces, a front bar, means releasably clamping said front bar along the front portion of said tooth body for adjustment longitudinally of said body, said front bar having a forwardly converging wedge shaped cross section extending laterally beyond both side faces of said tooth body, said wedge shaped cross section being formed by a pair of substantially flat faces and being substantially pointed at its lower end, and an ammonia tube attached to the rear face of said tooth body and spaced laterally inwardly of the opposed side faces of said body, said tube having a mouth at its lower end located directly behind said rear face adjacent the lower end thereof.

2. A harrow tooth for the dispensing of liquid ammonia into the soil, comprising a depending longitudinally disposed tooth body having a groove of triangular cross section in the front face thereof and having a pair of laterally opposed side faces and a rear face, a front bar having a substantially quadrangular cross-sectional shape fitted in said triangular groove, said front bar being substantially pointed at its lower end, means releasably clamping said front bar against said tooth body, said front bar having a front portion defined by a pair of substantially flat faces extending beyond the laterally opposed side faces of said tooth body, and an ammonia tube attached to the rear face of said tooth body and spaced laterally inwardly of the opposed side faces of said body, said tube having a mouth at its lower end located directly beyond said rear face adjacent the lower end thereof.

3. A harrow tooth for the dispensing of liquid ammonia into the soil comprising a depending longitudinally disposed tooth body of substantially rectangular cross section having a flat front face and laterally opposed sides, a front bar having a cross-sectional shape substantially in the form of an isosceles triangle, means clamping said front bar against the front face of said tooth body for longitudinal adjustment relative thereto and with its base in contact with the front face of the tooth body and projecting laterally beyond both sides of said tooth body, said front body being substantially pointed at its lower end and having a pair of flat faces, and an ammonia tube carried by said harrow tooth and located immediately behind the said tooth body and said front bar, and spaced laterally inwardly from the opposite lateral extremities of said front bar.

4. A harrow tooth according to claim 3, characterized in that a guiding sheath is provided along part of the length of the front bar, said guiding sheath enclosing a portion of the front bar and being constructed with bent edges for abutment against the side faces of the tooth body.

References Cited in the file of this patent

UNITED STATES PATENTS

| | | |
|---|---|---|
| 604,223 | Babcock | May 17, 1898 |
| 664,397 | French | Dec. 25, 1900 |
| 728,347 | Whitney | May 19, 1903 |
| 2,619,054 | Bell | Nov. 25, 1952 |
| 2,781,733 | Graham | Feb. 19, 1957 |
| 2,857,863 | Jessen | Oct. 28, 1958 |
| 2,904,119 | Hunter | Sept. 15, 1959 |

FOREIGN PATENTS

| | | |
|---|---|---|
| 22,790 | Australia | May 27, 1935 |
| 6,326 | Canada | June 25, 1876 |
| 81,890 | Germany | Dec. 1, 1894 |
| 661,765 | Germany | June 25, 1938 |